G. JACOBS.
FILING CABINET.
APPLICATION FILED JUNE 1, 1908.
922,590. Patented May 25, 1909.
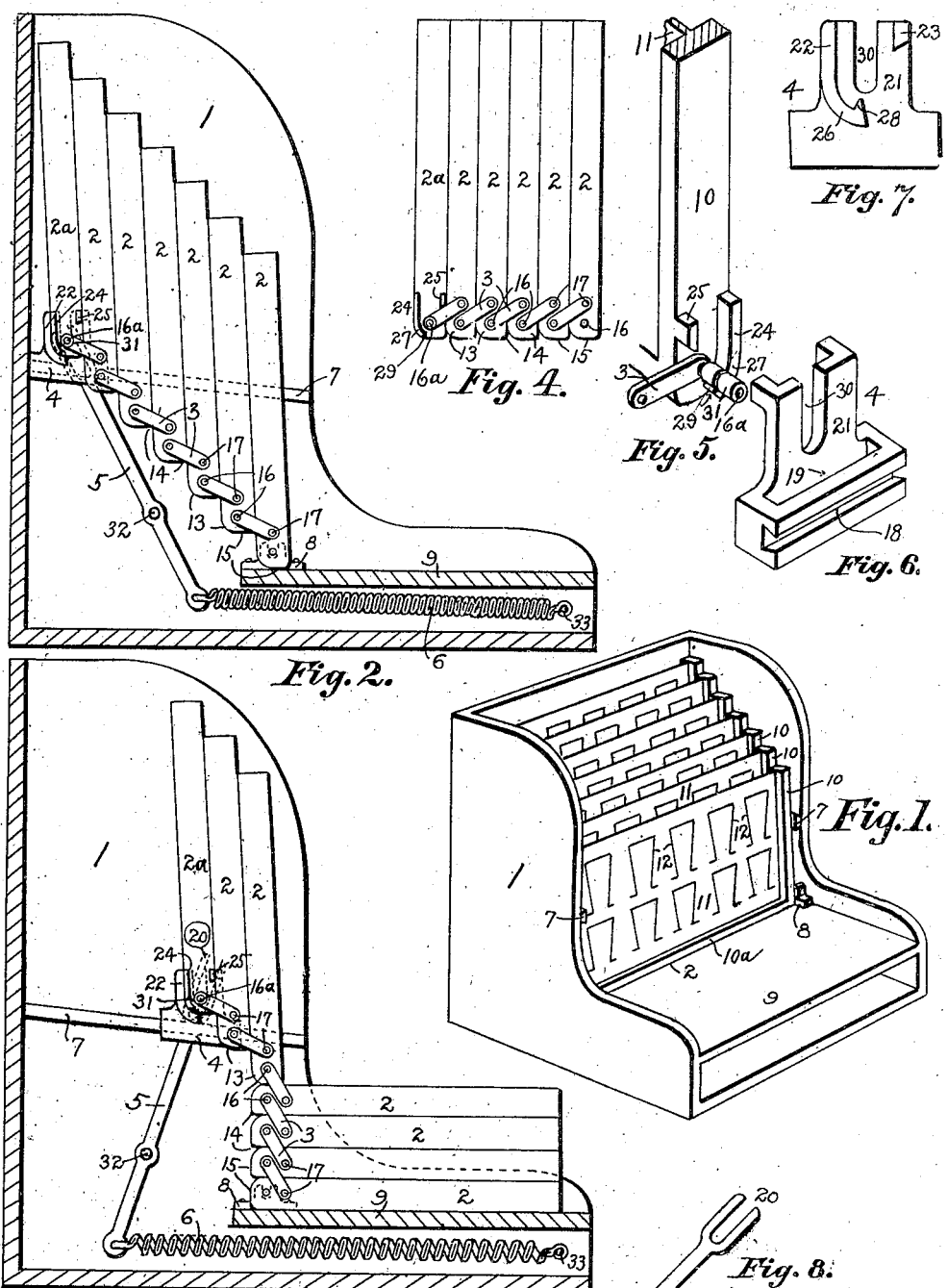

UNITED STATES PATENT OFFICE.

GEORGE JACOBS, OF ALLIANCE, OHIO, ASSIGNOR TO HARRY FREASE, TRUSTEE, OF CANTON, OHIO.

FILING-CABINET.

No. 922,590.  Specification of Letters Patent.  Patented May 25, 1909.

Application filed June 1, 1908. Serial No. 435,917.

*To all whom it may concern:*

Be it known that I, GEORGE JACOBS, a subject of the Emperor of Germany, residing at Alliance, in the county of Stark and State of Ohio, have invented a new and useful Filing-Cabinet, of which the following is a specification.

The invention relates to a filing cabinet for bills of sales or accounts, as of a retail merchant, and more particularly to that class of cabinets containing a series of leaves located uprightly in echelon, so that the upper edge of each leaf is exposed above the edge of the leaf in front of it, the leaves being hinged or pivoted and adapted to be folded forward for the purpose of exposing and giving access to the sides of the several leaves.

One object of the invention is to provide means for individually and collectively connecting and gearing the leaves so that, when folded forward to a prone position, or when removed from the case, they are adapted to be collocated or assembled face to face in a rectangular pack, within a space substantially equal to the area of one leaf and the combined depth of all the leaves, so that in this relation the entire series of leaves can be readily inserted in a safe or vault for security without consuming undue space therein.

A further object of the invention is to provide means for automatically moving the upright leaves forward or backward at the same time the leaves in front of them are lowered or raised, so that the lower end of the foremost one of the upright leaves always occupies the same vertical plane and is, therefore, conveniently accessible for inserting and removing bills at the same distance from the forward side of the cabinet.

Another object of the invention is to provide means for counter-balancing the series of leaves to hold them, individually and collectively, in the normal upright position, and so that when one or more leaves are started upward from the prone position, they are automatically thrown to and then remain in the upright position.

These general objects and other subsidiary advantages, are attained by the construction, mechanism and arrangement illustrated in the accompanying drawings, forming part hereof, in which—

Figure 1 is a perspective view of the cabinet, showing the leaves in their normal nearly vertical or upright position; Fig. 2, a vertical-longitudinal section of the case, showing an end elevation of the series of leaves in their normal upright position; Fig. 3, a similar section, showing some of the leaves rotated forward to their prone position; Fig. 4, an end elevation of the leaves removed from the cabinet and collocated in a rectangular pack; Fig. 5, a fragmentary perspective view of one link and the corner of the upper rear leaf; Fig. 6, a detached perspective view of one slide bracket; Fig. 7, an inside elevation of the same; Fig. 8, a detached side elevation of one spring lever; and Fig. 9, a side elevation of one fixed bearing.

Similar numerals refer to similar parts throughout the drawings.

The cabinet is composed of the case 1, the series of leaves 2 and $2^a$, the connecting links 3, the slide brackets 4, the lever 5 and the spring 6. The case 1 is preferably made open in front and on top to give free access to the leaves. The nearly horizontal track 7 is formed or attached on each side wall of the case, near the middle thereof, and U-shaped bearings, as 8, are formed or attached in each side of the case near the bottom part, preferably on the shelf 9 therein.

The leaves 2 and $2^a$ are preferably formed with the side and end rims 10 and $10^a$ and the relatively thin middle plates 11, thus forming recesses in each face of the leaves for the filing of bills which are held by the clips 12 in the usual manner. The normal lower edge of each leaf is formed round in its rear quadrant 13 and substantially square in its forward quadrant 14, thus presenting the substantially flat face 15 in the forward half of the edge; and the pivot pins or trunnions 16 and $16^a$ are provided on each inner-end corner of the leaf substantially in the axis of the rounded quadrant of the lower edge. The normally lower ends of the leaves are hinged or connected together by means of the links 3, the rear end of each link being pivoted on the trunnion of one leaf, and the forward end being pivoted at 17 to the side edges of the adjoining leaf at a point above the trunnion, with reference to the adjacent lower edge of the leaf. This manner of hinging and connecting the leaves of the series, permits them to be assembled, face to face, in echelon, as shown in Figs. 1 and 2, and also to be collocated in a rectangular pack, as shown in Fig. 4.

Each slide bracket 4 is provided on its outer sides with the longitudinal groove 18 which is preferably dovetailed and is adapted to operate by sliding on the corresponding track 7 which is made of a similar section to hold the bracket in position. In the middle part of the bracket is provided the longitudinal-vertical slot 19 in which the forked end 20 of the lever 5 is adapted to operate. The inner wall of the bracket is extended upward to form the plate 21 on the inner rear side of which is formed the flange 22 and on the inner forward side, the lug 23. A corresponding flange 24 and a lug 25 are provided on the lower portion of each end edge of the rearmost leaf, which flange and lug are adapted to fit in the socket formed by the flange and lug of the bracket, the bracket flange being curved in its lower portion 26 to fit the correspondingly curved lower portion 27 of the leaf flange, and is also provided with the square shoulder 28 which is adapted to abut the end 29 of the leaf flange, whereby the rearmost leaf is securely held in an upright position, the bracket being so shaped as to tilt the leaf slightly backward at its upper end from a true vertical position.

The U-shaped slot 30 is provided in the wall of each bracket, to receive the trunnion $16^a$ of the rearmost leaf. The trunnions $16^a$ are extended to protrude outside the walls of the brackets, and the rollers 31 are preferably provided on these extended ends, which rollers are adapted to operate in the forked ends, as 20, of the levers. One lever is pivoted, as at 32, on each side wall of the case, and the lower end of the lever is drawn forward by the energy of the retractive spring 6, which is connected in the forward part of the case at 33.

The leaves are placed in the case in their upright position by inserting the flanges and lugs of the rearmost leaf in the sockets of the slide-brackets, with the trunnions thereof in the forked ends of the levers, and by inserting the trunnions of the foremost leaf in the U-shaped bearings of the case. In this relation, the upper leaf is held forcefully backward by the action of the springs and levers, and by the same action each successive leaf is likewise held upward and in a slightly backward inclined position against the leaf in its rear, by reason of the fact that the line between the link pivots passes above the lower forward corner of the rear leaf. The backward inclination of the respective leaves also assists in preventing them from tilting forward. Furthermore, the forward flat portion 15 and the corner 14 of the lower side-edge of the foremost upright leaf, which is adapted to rest either on the shelf 9 in the case of the first leaf, or on the upper face of the adjoining prone leaf in case of an intermediate leaf, serves to prevent a rotation of the foremost leaf, for the reason that such a rotation must first raise the leaf a distance equal to the protrusion of the corner beyond the radius of the rounded rear quadrant of the lower edge. It is evident, however, that one or more of the leaves can be rotated forward by forcefully overcoming the resistance of the protruding corner of the lower edge, of the link connections and of the spring levers; and in so doing, the foremost leaf is raised a slight distance to rotate it over its protruding corner of the lower edge and all the other leaves are drawn forward by means of the connecting links, so that the next leaf, which now becomes the foremost upright leaf, will be brought forward into a position directly above the position formerly held by the last rotated leaf. It is furthermore evident that when one or more leaves have been rotated upward by manual means a portion of the distance toward the upright position, the levers and springs will complete the movement and throw the leaf upward to abut the next leaf in its rear. The tracks 7 are inclined slightly downward toward the front of the case, to accommodate the slight difference in the vertical distance between the trunnions of the leaves when in their upright and prone positions. The rearmost leaf is adapted to be held constantly in its upright position when in the case; but it is evident that by removing the leaves from the case, which is preferably accomplished by merely bringing them all to the upright position, and then lifting the rearmost and foremost leaves out of the respective sockets and bearings, the leaves are adapted to be assembled together, face to face, in a rectangular pack, as shown in Fig. 4, in which relation they are adapted to be stored in a comparatively small receptacle.

It is evident that either the rearward inclination of the upright leaves or the square quadrant in the lower edges of the respective leaves can be employed in combination with means for forcing the rearmost leaf backward, to normally hold the leaves in upright position; and also that either one or both of these methods can be employed without the latter means, but in this event the rotation of the leaves upward after they are started will not be automatic, until they have nearly reached their upright position. It is furthermore evident that it is not necessary to round the rear quadrant of the connected edges of the leaves.

The improvements in filing cabinets which are illustrated and described but not broadly claimed herein, are made the subject-matter of generic claims in three several prior applications for Letters Patent, filed respectively August 17, 1907, Serial No. 388,966; November 18, 1907, Serial No. 402,585; and May 25, 1908, Serial No. 434,866.

What I claim as my invention, and desire to secure by Letters Patent, is—

1. A cabinet including a case with fixed bearings on opposite sides therein, slide-brackets in the case having sockets therein, a series of collocated leaves each having the forward quadrant of the normally lower edge formed substantially square with trunnions on the lower end corners substantially in the axis of the square quadrant, and links connecting the leaves, one end of each link being pivoted on the trunnion of one leaf and the other end being pivoted to the next forward leaf above the trunnion thereof, the trunnions of the foremost leaf being rotatably supported in the case-bearings and the rearmost leaf being uprightly supported with a rearward inclination in the bracket-sockets, with means acting to force the rearmost leaf backward in the case.

2. A cabinet including a case with fixed bearings on opposite sides therein, slide-brackets in the case having sockets therein, a series of collocated leaves with trunnions on the normally lower-end corners, and links connecting the leaves, one end of each link being pivoted on the trunnion of one leaf and the other end being pivoted to the next forward leaf above the trunnion thereof, the trunnions of the foremost leaf being rotatably supported in the case-bearings and the rearmost leaf being uprightly supported with a rearward inclination in the bracket-sockets, with means acting to force the rearmost leaf backward in the case.

3. A cabinet including a case with fixed bearings on opposite sides therein, slide-brackets in the case having sockets therein, a series of collocated leaves each having the forward quadrant of the normally lower edge formed substantially square with trunnions on the lower end corners substantially in the axis of the square quadrant, and links connecting the leaves, one end of each link being pivoted on the trunnion of one leaf and the other end being pivoted to the next forward leaf above the trunnion thereof, the trunnions of the foremost leaf being rotatably supported in the case-bearings and the rearmost leaf being uprightly supported in the bracket-sockets, with means acting to force the rearmost leaf backward in the case.

4. A cabinet including a case with fixed bearings on opposite sides therein, slide-brackets in the case having sockets therein, a series of collocated leaves each having the forward quadrant of the normally lower edge formed substantially square with the trunnions on the lower-end corners substantially in the axis of the square quadrant, and links connecting the leaves, one end of each link being pivoted on the trunnion of one leaf and the other end being pivoted to the next forward leaf above the trunnion thereof, the trunnions of the foremost leaf being rotatably supported in the case-bearings and the rearmost leaf being uprightly supported with a rearward inclination in the bracket-sockets.

5. A cabinet including a case with fixed bearings on opposite sides therein, slide-brackets in the case having sockets therein, a series of collocated leaves with trunnions on the normally lower end corners, and links connecting the leaves, one end of each link being pivoted on the trunnion of one leaf and the other end being pivoted to the next forward leaf above the trunnion thereof, the trunnions of the foremost leaf being rotatably supported in the case-bearings and the rearmost leaf being uprightly supported with a rearward inclination in the bracket-sockets.

6. A cabinet including a case with fixed bearings on opposite sides therein, slide-brackets in the case having sockets therein, a series of collocated leaves each having the forward quadrant of the normally lower edge formed substantially square with trunnions on the lower end corners substantially in the axis of the square quadrant, and links connecting leaves, one end of each link being pivoted on the trunnion of one leaf and the other end being pivoted to the next forward leaf above the trunnion thereof, the trunnions of the foremost leaf being rotatably supported in the case-bearings and the rearmost leaf being uprightly supported in the bracket-sockets.

7. A series of filing leaves located face to face, each leaf having one quadrant of the normally lower edge formed substantially square, and a series of links connecting the leaves, one end of each link being pivoted to one leaf substantially in the axis of the square quadrant and the other end being pivoted to the leaf adjoining the square-quadrant face of the one leaf above the quadrant axis of the adjoining leaf.

GEORGE JACOBS.

Witnesses:
RUTH A. MILLER,
JOSEPH FREASE.